United States Patent [19]

Okazaki

[11] Patent Number: 6,003,051
[45] Date of Patent: Dec. 14, 1999

[54] MAGNETIC STORAGE DEVICE AND FILTER ADJUSTING METHOD APPLIED TO THE SAME

[75] Inventor: Akifumi Okazaki, Tokyo, Japan

[73] Assignee: Kabushiki Kaisha Toshiba, Kawasaki, Japan

[21] Appl. No.: 09/036,694

[22] Filed: Mar. 9, 1998

[30] Foreign Application Priority Data

Dec. 25, 1997 [JP] Japan ..................................... 9-357338

[51] Int. Cl.⁶ ............................... G06J 7/12; G11B 5/09
[52] U.S. Cl. .................................. 708/3; 708/300; 360/46
[58] Field of Search .............................. 708/3, 300, 320, 708/322, 323; 375/263, 290, 291, 376, 745; 360/46

[56] References Cited

U.S. PATENT DOCUMENTS

| | | | |
|---|---|---|---|
| 5,220,466 | 6/1993 | Coker et al. | 360/46 |
| 5,375,145 | 12/1994 | Abbott et al. | 375/345 |
| 5,381,359 | 1/1995 | Abbott et al. | 708/322 |
| 5,768,320 | 6/1998 | Kovacs et al. | 375/341 |
| 5,786,951 | 7/1998 | Welland et al. | 360/46 |
| 5,886,842 | 3/1999 | Ziperovich | 360/51 |

FOREIGN PATENT DOCUMENTS 7-302467 11/1995 Japan.

OTHER PUBLICATIONS

"Digital Data Reproduction Apparatus", Derwent abstract No. 011490160 for JP 9-219067 (1997).

*Primary Examiner*—Chuong Dinh Ngo
*Attorney, Agent, or Firm*—Finnegan, Henderson, Farabow, Garrett & Dunner, L.L.P.

[57] ABSTRACT

The cut-off frequency and boost value of an analog filter on a read channel is set to initial values When the data is read from a disk, the read data is subjected to PR equalization at an FIR filter. At that time, a learning function provided on the FIR filter adjusts the tap coefficient so that an equalization error may be minimized. The cut-off frequency and boost value of the analog filter are modified until the adjusted tap coefficient has gone in a permitted range. After the tap coefficient of the FIR filter has gone in the permitted range, the cut-off frequency and boost value are stored in an EEPROM so that they can be used in a normal mode.

19 Claims, 9 Drawing Sheets

| | INPUT | POINT (P1) | POINT (P2) | POINT (P3) | OUTPUT |
|---|---|---|---|---|---|
| 1 | 0 | 0 | 0 | 0 | 0 |
| 2 | 0 | 0 | 0 | 0 | 0 |
| 3 | 1 | -0.25 | 0 | 0 | -0.25 |
| 4 | 2 | -0.5 | 1 | 0 | 0.5 |
| 5 | 4 | -1 | 2 | -0.25 | 0.75 |
| 6 | 16 | -4 | 4 | -0.5 | -0.5 |
| 7 | 16 | -4 | 16 | -1 | 11 |
| 8 | 4 | -1 | 16 | -4 | 11 |
| 9 | 2 | -0.5 | 4 | -4 | -0.5 |
| 10 | 1 | -0.25 | 2 | -1 | 0.75 |
| 11 | 0 | 0 | 1 | -0.5 | 0.5 |
| 12 | 0 | 0 | 0 | -0.25 | -0.25 |
| 13 | 0 | 0 | 0 | 0 | 0 |
| 14 | 0 | 0 | 0 | 0 | 0 |
| 15 | 0 | 0 | 0 | 0 | 0 |

MAGNETIC STORAGE DEVICE AND FILTER ADJUSTING METHOD APPLIED TO THE SAME

BACKGROUND OF THE INVENTION

This invention relates to a storage device using a partial response method (or provided with a read channel) and a filter adjusting method applied to the storage device.

This application is based on Japanese Patent Application No. 9-357338, filed on Dec. 25, 1997, the contents of which are incorporated herein by reference.

Many storage devices, such as magnetic disk drives, have used a PRML (Partial Response Maximum Likelihood) method in their read channel instead of a peak detection method. In the PRML read channel, a digital equalizer (e.g., a digital filter), such as an FIR (Finite Impulse Response) filter, has been used. The FIR filter has no phase delay and plays an important role in effecting a partial response to shape the waveform digitally.

In recent years, almost all learning functions provided for LSIs including PRML read channels (PRML-LSIs) have caused FIR filters to automatically optimize a tap coefficient according to an input signal, as disclosed in, for example, Jpn. Pat. Appln. KOKAI Publication No. 9-21906 or U.S. Pat. No. 5,381,359.

To cause an FIR filter to perform an ideal PR (Partial Response) equalization, multiple stages of taps are needed. As the absolute value of the tap coefficient of the FIR filter becomes larger, the delay time of the digital feedback gets longer, causing a PLL (Phase Lock Loop) circuit and an AGC (automatic Gain Control) amplifier to delay stating their operations. This makes longer the time required for the PLL and AGC to settle down, which worsens the formatting efficiency of the disk considerably, because each data sector on the disk requires a preamble section corresponding to the settling time.

A method of switching between an analog loop (a loop not including an FIR filter or a digital equalizer) and a digital loop (a loop including an FIR filter or a digital equalizer) has been known as a method of preventing the formatting efficiency of a disk from deteriorating. In the method, as shown in FIG. 1, immediately after the read gate RG has turned on, the data immediately after the A/D conversion is fed back to the loop and the AGC amplifier and PLL circuit are operated; when the loop becomes stable after a certain time has elapsed, the analog loop is switched to the digital loop.

However, the method of switching between the analog loop and the digital loop has the following problem: when the analog loop is changed to the digital loop, with the absolute value of the tap coefficient of the FIR filter being large, a large error will occur in the phase.

To overcome this problem, Jpn. Pat. Appln. KOKAI Publication No. 9-21906 has disclosed the technique for estimating a phase shift resulting from the tap coefficient of an FIR filter and using a phase-shift correction FIR filter to correct a phase error occurring when the analog loop is switched to the digital loop.

The inventor of the present invention has found out the following problem: when the analog loop is switched to the digital loop, with the absolute value of the tap coefficient of the FIR filter being large, both of the PLL loop and the AGC loop become unstable, because large errors occur in not only the phase but also the amplitude (gain).

In the PRML read channel (read/write channel), since a phase error is sensed from information on the amplitude, the sensed phase error is vague, especially when a lot of amplitude errors remain (when there are many boosts at the FIR filter), aggravating the settling of the PLL and AGC.

The reason why the amplitude fluctuates at the digital equalizer will be described by reference to FIGS. 2 to 4, using a case where the digital equalizer 3 is a 3-tap FIR filter.

In the 3-tap FIR filter of FIG. 2, when a signal (input waveform) is input to the filter, the tap coefficient is set negative against to a direction for boosting, making the amplitude of the filter output (OUTPUT) smaller as shown in FIGS. 3 and 4. To compensate for the decrease in the amplitude, feedback is applied to the AGC amplifier in such a manner that the input to the FIR filter becomes larger, leading to fluctuations in the amplitude. Similarly, when the tap coefficient is set positive (when the FIR filter is forced to function as a low-pass filter), the amplitude of the filter output is larger than that of the filter input. To compensate for this, feedback is applied to the AGC amplifier in such a manner that the input to the FIR filter becomes smaller, resulting in fluctuations in the amplitude.

Almost all the present-day read channels, when the read gate RG is off, operate in a mode where the AGC amplifier is controlled at the peak value of the input waveform without operating the A/D converter or PLL circuit to save the power consumption. In such read channels, the amplitude of the output of the AGC amplifier has a larger error at the instant that the read gate RG actually turns on.

For this reason, the amplitude fluctuates at the digital equalizer when the analog loop is switched to the digital loop.

The fact that the amplitude fluctuates at the digital equalizer when the analog loop is switched to the digital loop means that the final target values of the AGC loop and PLL loop differ greatly between the digital loop and the analog loop. The difference of the final target values between the digital loop and the analog loop becomes larger in proportion to (the absolute value of) the tap coefficient of the digital equalizer. When there are variations in the characteristics of the heads (e.g. the characteristics of the heads themselves, the head's floating height), the film thickness of the recording layer of each disk (magnetic recording medium) and the magnetic characteristics of each disk, this gives rise to an extremely large or small user density (the value determined by the product of the transfer rate of the disk and the waveform width (time width) at the position of 50% of the amplitude of an isolated waveform). In this case, the absolute value of the tap coefficient of the digital equalizer becomes larger. This prevents the analog loop from switching smoothly to the digital loop, attributing to the digital equalizer's failure to learn or errors on ECC (Error Checking and Correction).

BRIEF SUMMARY OF THE INVENTION

The object of the present invention is to provide a storage device capable of overcoming drawbacks stemming from the fact that the final target value of the control loop differs considerably between the digital loop and the analog loop in a partial-response read channel and a filter adjusting method applied to the device.

According to a first aspect of the present invention, there is provided a partial-response storage device comprising: an automatic gain control amplifier for amplifying a read signal read from a recording medium to a signal with a specific amplitude; an analog filter in which a cut-off frequency and a boost value can be set and which removes high-frequency noises contained in the amplified read signal on the basis of the cut-off frequency and emphasizes the high region of a pass band of the amplified read signal on the bias of the boost value; an analog/digital converter for digitizing an output signal from the analog filter; a digital equalizer which has the function of adjusting a tap coefficient and subjects the output data from the analog/digital converter to partial response equalization; a phase lock loop circuit for generating a clock synchronizing with either the output of the analog/digital converter or that of the digital equalizer in a phase synchronizing loop; control loop switching portion for switching between an analog loop used to feed back the output data from the analog/digital converter and a digital loop used to feed back the output data from the digital equalizer with a desired timing and applying the feedback to the automatic gain control amplifier and the phase lock loop circuit; filter adjusting portion for adjusting the cut-off frequency and boost value of the analog filter; judging portion for judging whether or not the tap coefficient of the digital equalizer is in a predetermined permitted range each time the filter adjusting portion adjusts the cut-off frequency and boost value of the analog filter; and filter parameter decision portion for determining the cut-off frequency and boost value adjusted by the filter adjusting portion to be the optimum cut-off frequency and boost value for the analog filter when the judging portion has judged that the tap coefficient of the digital equalizer is in the permitted range.

According to a second aspect of the present invention, there is provided a filter adjusting method applied to a partial-response storage device including an automatic gain control amplifier for amplifying a read signal read from a recording medium to a signal with a specific amplitude, an analog filter in which a cut-off frequency and a boost value can be set and which removes high-frequency noises contained in the amplified read signal on the basis of the cut-off frequency and emphasizes the high region of a pass band of the amplified read signal on the bias of the boost value, an analog/digital converter for digitizing an output signal from the analog filter, a digital equalizer which has the function of adjusting a tap coefficient and subjects the output data from the analog/digital converter to partial response equalization, a phase lock loop circuit for generating a clock synchronizing with either the output of the analog/digital converter or that of the digital equalizer in a phase synchronizing loop, and control loop switching portion for switching between an analog loop used to feed back the output data from the analog/digital converter and a digital loop used to feed back the output data from the digital equalizer with a desired timing and applying the feedback to the automatic gain control amplifier and the phase lock loop circuit, the filter adjusting method comprising the steps of: adjusting the cut-off frequency and boost value of the analog filter on the basis of the tap coefficient of the digital equalizer; and determining a cut-off frequency and boost value for the analog filter so that the tap coefficient of the digital equalizer may lie in a predetermined permitted range.

With these configurations, when the cut-off frequency and boost value of the analog filter is adjusted, the learning function added to the digital equalizer automatically adjusts the tap coefficient on the basis of mean squared-errors (MSE). Depending on how to adjust the cut-off frequency and boost value of the analog filter, considerable part of PR equalization is performed on the analog filter side. That is, PR equalization is performed without imposing a substantial burden on the digital equalizer, which enables (the absolute value of) of the tap efficient of the digital equalizer to be adjusted to a smaller value.

As a consequence, the tap coefficient of the digital equalizer can be caused to go in the permitted range by adjusting the cut-off frequency and boost value of the analog filter, while checking the tap coefficient. The cut-off frequency and boost value of the analog filter at the time when the tap coefficient has gone in the permitted range are determined to be the optimum cut-off frequency and boost value. Use of these optimum values makes the analog loop switch to the digital loop smoothly. Namely, use of the optimum cut-off frequency and boost value reduces the amount of fluctuation in the amplitude of the output of the digital equalizer with respect to its input at the time of the switching of the analog loop to the digital loop, which shortens the settling time. This shortens the length of the preamble section of a data sector shorter, resulting in an increase in the formatting efficiency of the recording medium.

According to a third aspect of the present invention, there is provided a partial-response storage device comprising: an automatic gain control amplifier for amplifying a read signal read from a recording medium to a signal with a specific amplitude; an analog filter in which a cut-off frequency and a boost value can be set and which removes high-frequency noises contained in the amplified read signal on the basis of the cut-off frequency and emphasizes the high region of a pass band of the amplified read signal on the bias of the boost value; an analog/digital converter for digitizing an output signal from the analog filter; a digital equalizer which has the function of adjusting a tap coefficient and subjects the output data from the analog/digital converter to partial response equalization; a phase lock loop circuit for generating a clock synchronizing with either the output of the analog/digital converter or that of the digital equalizer in a phase synchronizing loop; control loop switching portion for switching between an analog loop used to feed back the output data from the analog/digital converter and a digital loop used to feed back the output data from the digital equalizer with a desired timing and applying the feedback to the automatic gain control amplifier and the phase lock loop circuit; and a control circuit which applies feedback to the automatic gain control amplifier on the basis of either the output of the analog/digital converter or that of the digital equalizer and which includes an offset voltage value decision circuit that computes the amount of fluctuation in the amplitude of the output from the digital equalizer with respect to its input on the basis of the tap coefficient of the equalizer and determines an offset voltage value for the automatic gain control amplifier corresponding to the amount of fluctuation in the amplitude, and a feedback circuit which applies feedback to the automatic gain control amplifier during a period of the analog loop on the basis of the output data from the analog/digital converter and the offset voltage having the voltage value determined by the offset voltage value decision circuit.

According to a fourth aspect of the present invention, there is provided a partial-response storage device comprising: an automatic gain control amplifier for amplifying a read signal read from a recording medium to a signal with a specific amplitude; an analog filter in which a cut-off frequency and a boost value can be set and which removes high-frequency noises contained in the amplified read signal on the basis of the cut-off frequency and emphasizes the high region of a pass band of the amplified read signal on the bias of the boost value; an analog/digital converter for digitizing an output signal from the analog filter; a digital equalizer which has the function of adjusting a tap coefficient and subjects the output data from the analog/digital converter to partial response equalization; a phase lock loop circuit for generating a clock synchronizing with either the output of the analog/digital converter or that of the digital equalizer in a phase synchronizing loop; control loop switching portion for switching between an analog loop used to feed back the output data from the analog/digital converter and a digital loop used to feed back the output data from the digital equalizer with a desired timing and applying the feedback to the automatic gain control amplifier and the phase lock loop circuit; a CPU which controls all of the storage device and which computes the amount of fluctuation in the amplitude of the output of the digital equalizer with respect to its input on the basis of the tap coefficient of the digital equalizer and determines an offset voltage value for the automatic gain control amplifier corresponding to the amount of fluctuation in the amplitude; and a control circuit which applies feedback to the automatic gain control on the basis of either the output data of the analog/digital converter or that of the digital equalizer and which includes an offset voltage output circuit that outputs an offset voltage having the offset voltage value determined by the CPU, and a feedback circuit that applies feedback to the automatic gain control amplifier during a period of the analog loop on the basis of the output data from the analog/digital converter and the offset voltage output from the offset voltage output circuit.

According to a fifth aspect of the present invention, there is provided a method of controlling an automatic gain control amplifier applied to a partial-response storage device including an automatic gain control amplifier for amplifying a read signal read from a recording medium to a signal with a specific amplitude, an analog filter in which a cut-off frequency and a boost value can be set and which removes high-frequency noises contained in the amplified read signal on the basis of the cut-off frequency and emphasizes the high region of a pass band of the amplified read signal on the bias of the boost value, an analog/digital converter for digitizing an output signal from the analog filter, a digital equalizer which has the function of adjusting a tap coefficient and subjects the output data from the analog/digital converter to partial response equalization, a phase lock loop circuit for generating a clock synchronizing with either the output of the analog/digital converter or that of the digital equalizer in a phase synchronizing loop, and control loop switching portion for switching between an analog loop used to feed back the output data from the analog/digital converter and a digital loop used to feed back the output data from the digital equalizer with a desired timing and applying the feedback to the automatic gain control amplifier and the phase lock loop circuit, the method comprising the steps of: computing the amount of fluctuation in the amplitude of the output from the digital equalizer with respect to its input on the basis of the tap coefficient of the equalizer and determining an offset voltage value for the automatic gain control amplifier corresponding to the amount of fluctuation in the amplitude, and applying feedback to the automatic gain control amplifier during a period of the analog loop on the basis of the output data from the analog/digital converter and the offset voltage having the determined voltage value.

With these configurations, taking advantage of the fact that the amount of fluctuations in the amplitude of the output of the digital equalizer with respect to its input can be computed from the tap coefficient of the digital equalizer, the amount of fluctuation in the amplitude is computed and an offset voltage value for the AGC amplifier is determined. Then, during a period of the analog loop, feedback is applied to the AGC amplifier on the basis of the output data from the A/D converter and the offset voltage. More specifically, a new reference value is obtained by adding the offset voltage to a reference voltage value serving as a reference for comparison with (the amplitude of) the output data of the A/D converter. The new reference value is compared with the output data from the A/D converter and feedback is applied to the AGC amplifier according to the comparison result.

As a result, before the analog loop is switched to the digital loop, the gain of the AGC amplifier is increased or decreased, depending on the offset voltage corresponding to a fluctuation (an increase or a decrease) in the amplitude of the signal of the digital equalizer at the time when the analog loop is switched to the digital loop. Specifically, when the digital equalizer has been equalized in the direction in which a boost is applied (when the tap coefficient is negative), the amplitude of the signal of the digital equalizer decreases. To compensate for this, the gain of the AGC amplifier is increased beforehand by a value corresponding to the decrease in the amplitude at the digital equalizer (that is, the offset voltage produced when the analog loop is switched to the digital loop). Furthermore, when the digital equalizer functions as a low-pass filter (when the tap coefficient is positive), the amplitude of the signal of the digital equalizer increases. To compensate for this, the gain of the AGC amplifier is decreased beforehand by a value corresponding to the increase in the amplitude at the digital equalizer.

This minimizes fluctuations in the amplitude at the digital equalizer when the analog loop is switched to the digital loop, which assures a stable operation even when the tap coefficient is large.

Furthermore, the switching of the analog loop to the digital loop can be done more stably by combining the above two configurations: in one configuration, the tap coefficient of the digital equalizer is caused to go in the permitted range by adjusting the cut-off frequency and boost value of the analog filter, while checking the tap coefficient of the digital equalizer, and in the other configuration, the gain of the AGC amplifier is allowed to vary automatically according to the tap coefficient of the digital equalizer.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Hereinafter, referring to the accompanying drawings, embodiments of the present invention will be explained.

A first embodiment of the present invention will be explained.

Figure 5:
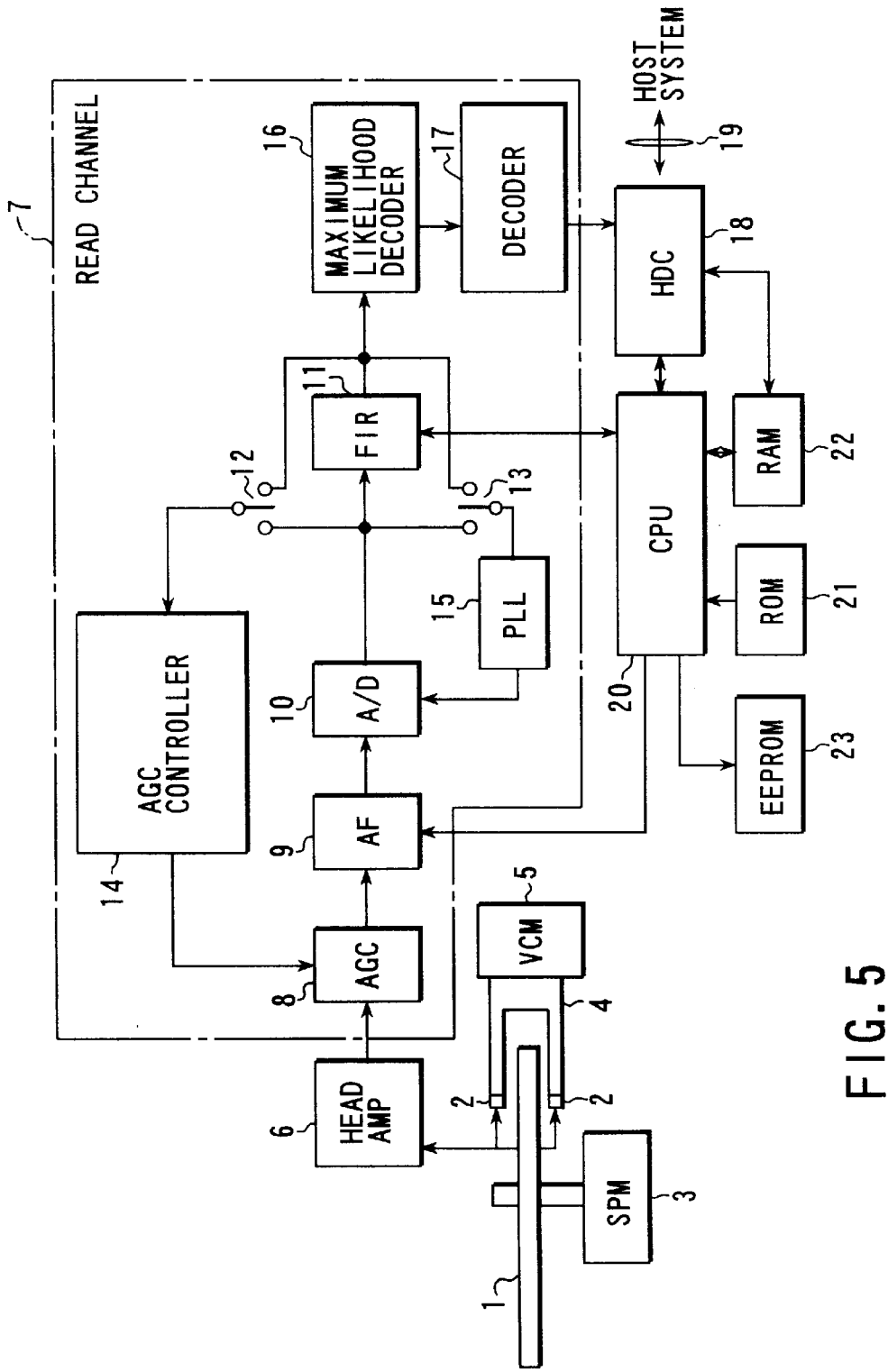
FIG. 5 is a block diagram of a magnetic disk device according to a first embodiment of the present invention, centering on its read channel.

FIG. 5 is a block diagram of a magnetic disk device according to the first embodiment, centering on its read channel.

In FIG. 5, numeral 1 indicates a disk (magnetic disk), a medium on which data is recorded magnetically. Numeral 2 represents a head (magnetic head) used to write (or record) data onto the disk 1 or read (retrieve) data from the disk 1. The head 2 is assumed to be provided on each side of the disk 1. While in the first embodiment, a single disk is used as the disk 1, two or more disks stacked one on top of another may be used.

Each side of the disk 1 has a CRD (Constant Density Recording) format structure to increase the formatting efficiency of the disk 1, taking advantage of the outer area of the disk 1 where the physical length of a track (cylinder) is longer than that on the inner area. In the format structure, the data area on each side of the disk 1 is divided radially into plural zones and the number of data sectors per cylinder (track) differs from zone to zone (the outer zones have more sectors), that is, the media transfer rate (line recording density) differs from zone to zone (the cylinders on the outer zones have greater rates). In a zone, the disk transfer rate of each cylinder is the same.

The disk 1 is rotated by a spindle motor (SPM) 3 at high speed. The heads 2 are provided on a head moving mechanism called a carriage 4 and move radially across the disk 1 as the carriage 4 moves. The carriage 4 is driven by a voice coil motor (VCM) 5.

Each of the heads 2 is connected to, for example, a head amplifier circuit (Head Amp) 6 provided on a flexible printed circuit (FPC). The head amplifier circuit 6 controls the switching between the heads 2 and the input and output of a read/write signal to and from the heads 2. The head amplifier circuit 6 includes a head amplifier (not shown) for amplifying the analog output (analog reproduced output) read by the heads 2 and a write driver (not shown) for outputting a write signal (write current) to the heads 2 according to the writing data sent from the write channel.

The head amplifier circuit 6 is connected to an AGC amplifier (AGC) 8. The AGC amplifier 8 amplifies, to a specific amplitude, the analog output (read signal from the heads 2) amplified by the head amplifier of the head amplifier circuit 6.

The output of the AGC amplifier 8 is connected to the input of an analog filter (AF) 9. The analog filter 9 is, for example, an active filter, and has not only a low-pass filter function that removes high-frequency noises contained in the analog reproduced signal at the output stage of the AGC amplifier 8 but also a boost function that emphasizes the high-frequency region of the passing band. The analog filter 9 is designed to enable the cut-off frequency and boost value to be externally adjusted (set). In this embodiment, the cut-off frequency and boost value are adjusted by the CPU.

The output of the analog filter 9 is connected to the input of an A/D converter (A/D) 10. The A/D converter 10 converts the read signal (analog reproduced signal) from the analog filter 9 into digital data in synchronization with the sampling clock (hereinafter, referred to as the PLL clock) output from a PLL circuit 15.

The output of the A/D converter 10 is input to, for example, an FIR filter (FIR) 11 acting as a digital equalizer. The FIR filter 11 gives a PR (Partial Response) characteristic to the read channel. The FIR filter 11 is provided with such a learning function (filter adjustment learning function) as has been disclosed in Jpn. Pat. Appln. KOKAI Publication No. 9-219067 or U.S. Pat. No. 5,381,359.

Switches 12 and 13 for switching between the analog loop and the digital loop are connected to the FIR filter 11. The switch 12 switches between the input to the FIR filter 11 or the output of the A/D converter 10 and the output of the FIR filter 11 and supplies the selected output to the AGC controller 14. The switch 13 switches between the input to the FIR filter 11 or the output of the A/D converter 10 and the output of the FIR filter 11 and supplies the selected output to the PLL circuit 15.

The AGC controller 14 calculates amplitude errors occurred at the FIR filter 11 and applies feedback to the AGC amplifier 8 so that the amplitude errors in the analog loop and digital loop may be reduced to zero.

The PLL circuit 15 generates a clock (PLL clock) synchronizing with the output of the A/D converter 10 or FIR filter 11 in a phase synchronizing loop. The clock is used not only as the sampling clock for the A/D converter 10 but also as the timing clock for the FIR filter 11, AGC controller 14, and a maximum likelihood decoder 16.

The output of the FIR filter 11 is connected to the maximum likelihood decoder (maximum likelihood estimation decoder) 16. The maximum likelihood decoder 16 is, for example, a Viterbi decoder (Viterbi sensor) and senses the most likelihood data string (the most likely string) from the digital data (code data string) PR-equalized according to a Viterbi algorithm and outputs the sensed data to the decoder (recording decoder) 17. The decoder 17 decodes the data string sensed by the most likelihood decoder 16 into recording data such as NRZ code and outputs the decoded data to a disk controller (HDC) 18.

The AGC amplifier 8, analog filter 9, A/D converter 10, FIR filter 11, switches 12 and 13, AGC controller 14, PLL circuit 15, most likelihood decoder 16, and decoder 17 constitute a read channel 7. The read channel 7, together with a write channel (not shown), is provided in a single LSI (circuit unit called a PRML-LSI).

The HDC 18 is connected to a host system via a host interface 19 and controls not only the communication of commands and data with the host system but also the data communication with the read channel (read/write channel).

A CPU 20 is, for example, a one-chip microprocessor. The CPU 20 controls various sections in the magnetic disk device according to a control program (firmware) stored in a ROM 21. In the first embodiment, the CPU 20 performs characteristic control as follows: it adjusts the cut-off frequency and boost value of the analog filter 9 and the tap coefficient of the FIR filter 11 so that an output value from the AGC amplifier 8 at the time that the control loop has been switched from the analog loop to the digital loop reaches a steady value before data read out from the data section by the head amplifier circuit 6 is input to the AGC amplifier 8 (in the range of the preamble section of a data sector on the disk 1).

Connected to the CPU 20 are the ROM (Read Only Memory) 21 serving as a nonvolatile memory in which a control program for controlling each section of the magnetic disk device, a RAM (Random Access Memory) 22 serving as a programmable volatile memory providing a work area of the CPU 20 and a buffer area for temporarily storing the read data in sectors read from the disk 1 or the write data to be written onto the disk, and an EEPROM (Electrically Erasable and Programmable Read Only Memory) 23 functioning as a programmable nonvolatile memory device (nonvolatile memory) used to store control parameters for the magnetic disk device. The parameters stored in the EEPROM 13 include such filter parameters as the cut-off frequency and boost value of the analog filter 9 and the tap coefficient of the FIR filter. The cut-off frequency, boost value, and tap coefficient are stored zone by zone on each side of the disk 1.

The operation of the magnetic disk device of FIG. 5 will be explained briefly.

The signal (read signal) read from the disk 1 by the head 2 is amplified by the head amplifier circuit 6. After the read signal amplified by the head amplifier circuit 6 has been amplified by the AGC amplifier 8 to a specific amplitude so that the signal may lie in the dynamic range of the A/D converter 10, or after the amplitude of the signal has been adjusted, the amplified signal is digitized by the A/D converter 10, which converts it into digital data. The digital data of the read signal, or the read data, is subjected to PR equalization at the FIR filter 11.

Figure 1:
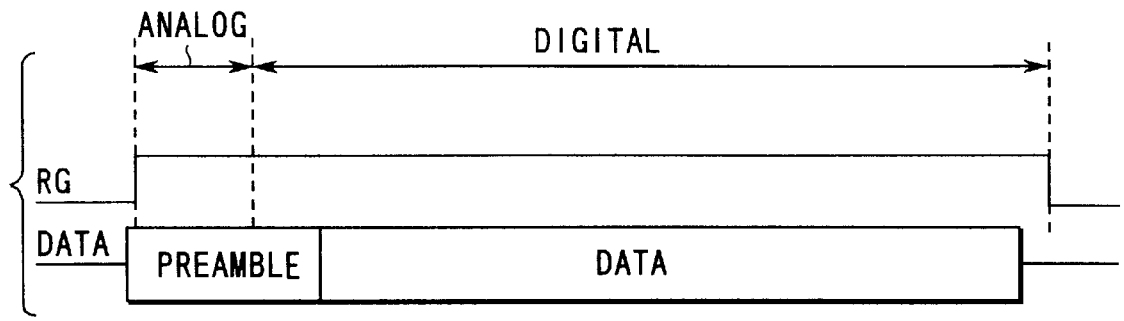
FIG. 1 is a drawing to help explain a conventional method of switching between an analog loop and a digital loop.
Figure 2:
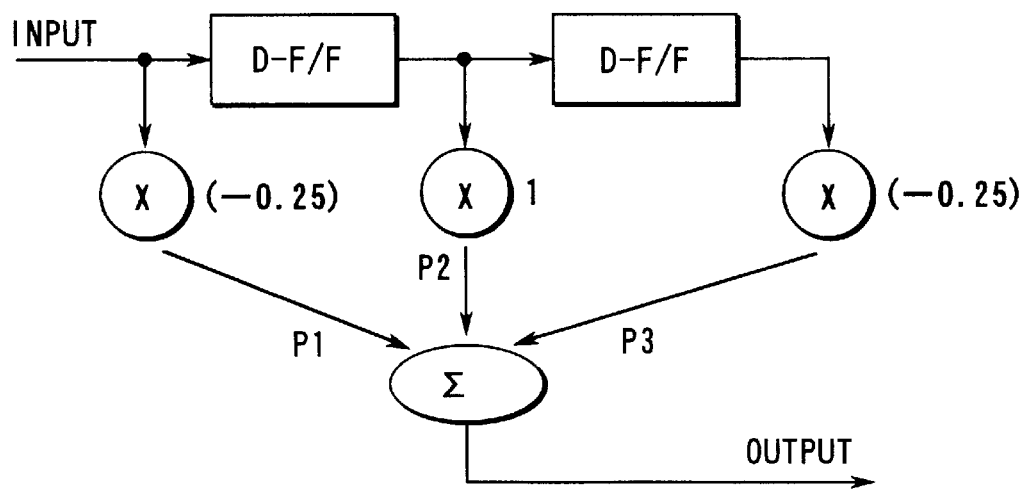
FIG. 2 is a schematic block diagram of a 3-tap FIR filter.
Figures 3, 4:
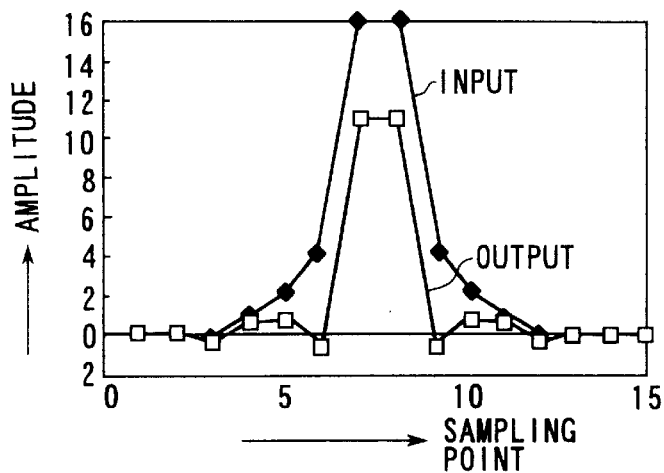
FIG. 3 is an example of input and output waveforms in the FIR filter of FIG. 2.
FIG. 4 shows an example of a table listing the amplitudes at various points of the FIR filter shown in FIG. 2.

Like the conventional technique shown in FIG. 1, the first embodiment uses a method of switching between the analog loop and the digital loop. Specifically, immediately after the read gate RG output from the HDC 18 has turned on, the switches 12 and 13 are changed to the input stage of the FIR filter 11, or the output stage of the A/D converter 10, thereby selecting the inputs of the AGC controller 14 and PLL circuit 15. This allows the data immediately after the A/D conversion by the A/D converter 10 to be fed back to the loops (i.e., the AGC loop and PLL loop). With the feedback, the AGC amplifier 18 and PLL circuit 15 are operated (the analog loop). Thereafter, at the time when the loop has become stable, the switches 12 and 13 are changed to the output stage of the FIR filter 11, causing the output of the FIR filter 11 to be fed back to the loops (the digital loop).

In the PRML read channel, it is important to perform PR equalization as exactly as possible. Previously, reducing mean squared-errors (MSE) was considered to be the most important and an FIR filter was adjusted by a learning function provided on the filter so that the MSE may be reduced to a minimum. In the case of an analog filter, such a cut-off frequency and boost value as theoretically minimize the MSE are used.

When filter adjustment is made, taking only MSE into account, the following problem arises: when such filter adjustment causes variations in the characteristics of the heads and disks (magnetic recording mediums) and therefore large variations in the user density, this imposes a heavy burden on the FIR filter, permitting read errors to take place.

As described earlier, the inventor of the present invention has realized that when the analog loop has switched to the digital loop, with the absolute value of the tap coefficient of the FIR filter being large, this causes a great error in the amplitude (gain), too.

To switch from the analog loop to the digital loop smoothly, it is necessary to reduce the absolute value of the tap coefficient of the FIR filter 11 as much as possible. Therefore, in the embodiment, the cut-off frequency and boost value of the analog filter 9 in the front stage of the FIR filter 11 are adjusted to cause the analog filter 9 to perform as much of PR equalization as possible. This prevents the tap coefficient of the FIR filter 11 from exceeding the permitted range.

Specifically, in the first embodiment, the tap coefficient of the FIR filter 11 is caused to fit in a predetermined permitted range by adjusting the cut-off frequency and boost value of the analog file 9 while checking the tap coefficient of the FIR filter 11 in the manufacturing stage of the magnetic disk device, instead of adjusting the filter on the basis of only mean squared-errors. This causes variations in the amplification factor (gain) of the AGC amplifier 8 at the time of the switching of the loop control to fit in the preamble section preceding the data section of a data sector on the disk 1. In other words, the output value from the AGC amplifier 8 reaches a steady value.

Figure 6:
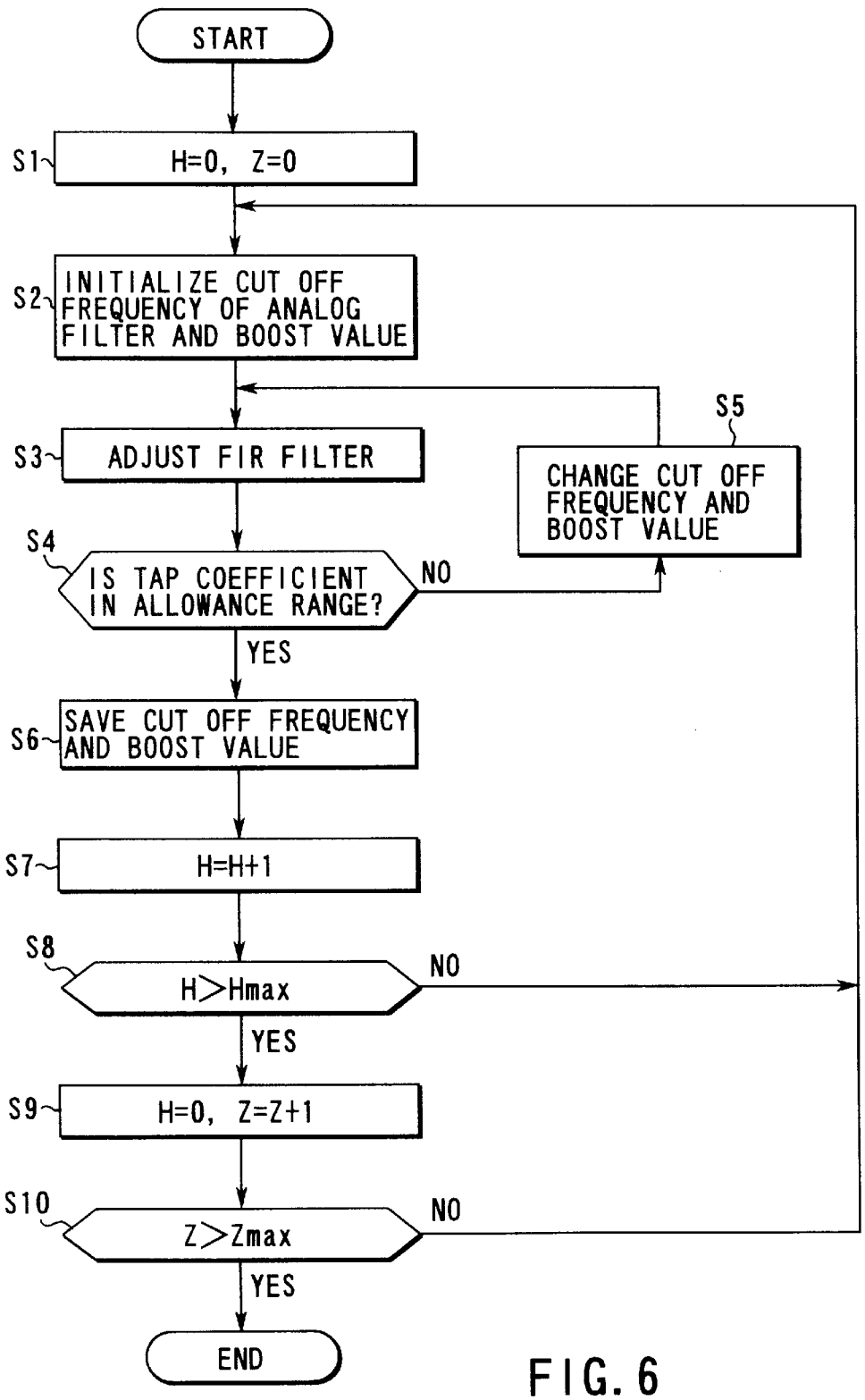
FIG. 6 is a flowchart for the process of adjusting the cut-off frequency and boost value of an analog filter, while checking the tap coefficient of an FIR filter applied to the first embodiment.

Hereinafter, the process of adjusting the cut-off frequency and boost value of the analog filter 9 while checking the tap coefficient of the FIR filter 11 will be described by reference to a flowchart in FIG. 6.

In the manufacturing stage of the magnetic disk device of FIG. 5, when the host system gives a command to specify the adjusting process to the device via the host interface 19, the CPU 20 executes the command according to (a specific filter adjusting routine in) the control program in the ROM 21. The mode in which the adjusting process is carried out is called the filter adjusting mode. The adjusting routine (adjusting program) may be sent from the host system.

The CPU 20 initializes both of the head number H indicating the side (or head) to be read from and the zone number Z indicating a zone on the disk 1 to zero (step S1). Then, the CPU 20 sets the cut-off frequency and boost value of the analog filter 9 to predetermined initial values (step S2). The initial values are assumed to be such a cut-off frequency and boost value as minimize mean squared-errors (MSE) theoretically.

In this state, when the CPU 20 reads the data from the zone specified by the zone number Z on the side of the disk 1 specified by the head number H, the read channel 7 carries out the above-described operation and the read data is subjected to PR equalization at the FIR filter 11. In this case, the learning function of the FIR filter 11 adjusts the tap coefficient so that MSE may be minimized (step S3).

The CPU 20 reads the tap coefficient of the FIR filter 11 after the filter adjustment by the learning function and judges whether or not the value is in the predetermined permitted range (step S4). The permitted range of the tap coefficient is set to a range of sufficient values to reduce the difference in amplitude between the analog loop and the digital loop.

When the tap coefficient of the FIR filter 11 is not in the permitted range, the CPU 20 changes the cut-off frequency and boost value of the analog filter 9 (step S5). Then, when the CPU 20 reads the data again, the learning function added to the FIR filter 11 adjusts the tap coefficient so that MSE may be minimized (step S3).

If the tap coefficient of the FIR filter 11 goes in the permitted range as a result of the adjustment, the CPU 20 will correlate the cut-off frequency and boost value of the analog filter 9 at that time with the present head number H and zone number Z and store them in the EEPROM 23 (step S6). The present head number H and zone number Z are considered to be the optimum setting values for the analog filter 9 in reading the data from the zone specified by the head number H and zone number Z.

The CPU 20 repeats the above operation for the same zone number Z, while changing the disk side (head number H) (step S7). After finishing the operation for the same zone number Z on all of the sides of the disk (step S8), the CPU 20 then changes the zone (zone number Z) (step S9) and repeats the above operation. After finishing the operation for all of the zones on all of the sides of the disk (step S10), the CPU 20 completes the filter adjusting process. At that time, the optimum cut-off frequency and boost value for the analog filter 9 for each zone on each side of the disk have been registered in th e EEPROM 23.

When accessing the disk in a normal mode (read operation), the CPU 20 reads the cut-off frequency and boost value of the analog filter 9 registered in the EEPROM 23 in such manner that they correspond to the disk surface and zone to be accessed and sets them in the analog filter 9. This allows the analog filter 9 to perform as much of PR equalization as possible, alleviating the burden on the FIR filer 11. This causes the tap coefficient to lie in the permitted range even if the learning function added to the FIR filter 11 operates. As a result, fluctuations in the amplification factor (gain) of the AGC amplifier 8 are caused to fit in the preamble section preceding the data section in a data sector on the disk 1.

Figure 7A:
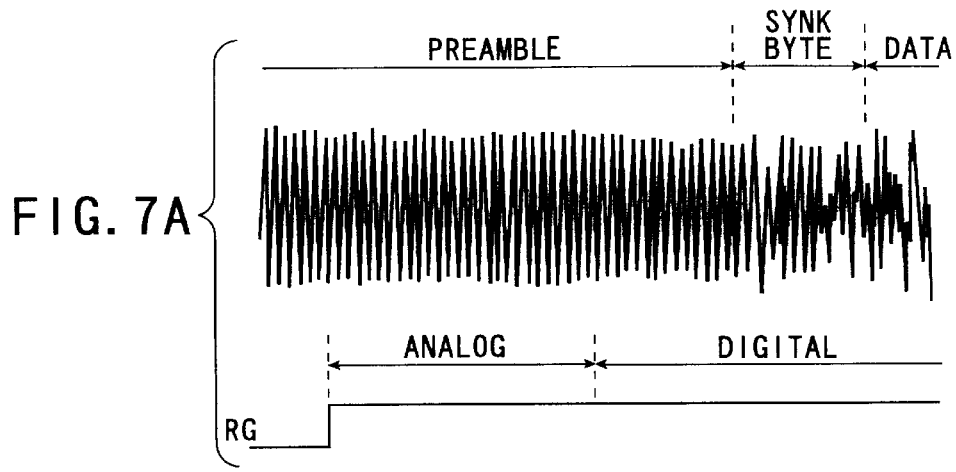
FIGS. 7A and 7B show read signal waveforms at the output stage of the analog filter before and after the analog loop is changed to the digital loop in the first embodiment.
Figure 7B:
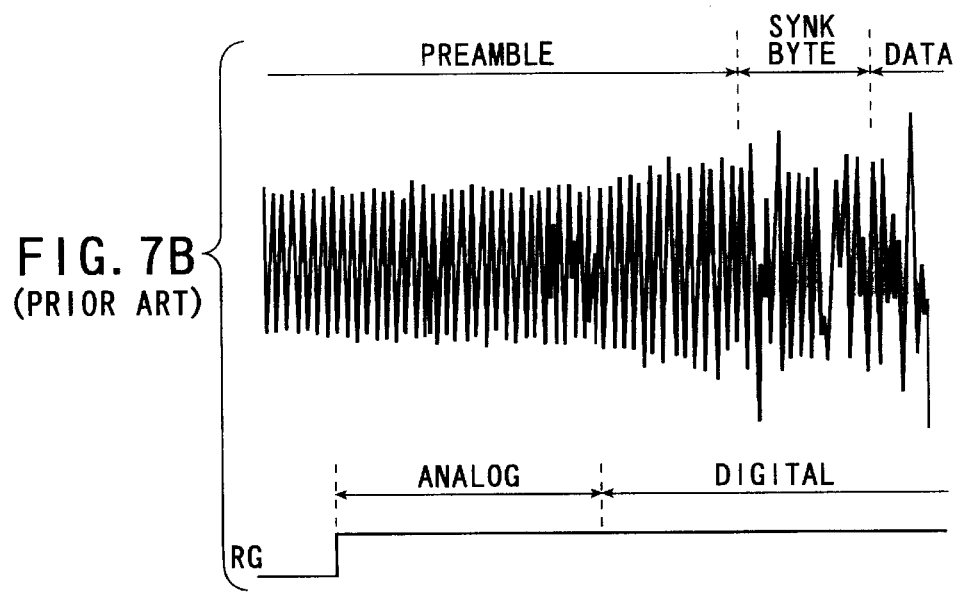

FIG. 7A shows the read signal, for example, the output waveform of the analog filter (input of the AaD converter 10) in the above process. For the sake of comparison, FIG. 7B shows the output waveform of the analog filter 9 using a conventional method of adjusting a filter on the basis of only mean squared errors is applied.

As seen from the waveforms, fluctuations in the amplitude of the output of the AGC amplifier 8 in the switching of the analog mode to the digital mode are forced to go in the preamble section in the first embodiment.

Generally, the length of the preamble section has a margin for enabling even a head of the lowest possible level permitted in design specifications to operate properly. In the first embodiment, the way of forcing the analog filter 9 and FIR filter 11 to share PR equalization is determined, taking into account the transition time in the switching of the analog loop to the digital loop, differently from the conventional method taking into account only mean squared-errors. Then, the cut-off frequency and boost value of the analog filter 9 are adjusted so that the analog filter 9 may perform as much of PR equalization as possible. This makes the length of preamble shorter, improving the formatting efficiency of the disk 1.

While in the first embodiment, the disk 1 has a CRD format structure, the disk 1 may have another format structure.

Hereinafter, a magnetic disk device according to a second embodiment of the present invention will be explained.

Figure 8:
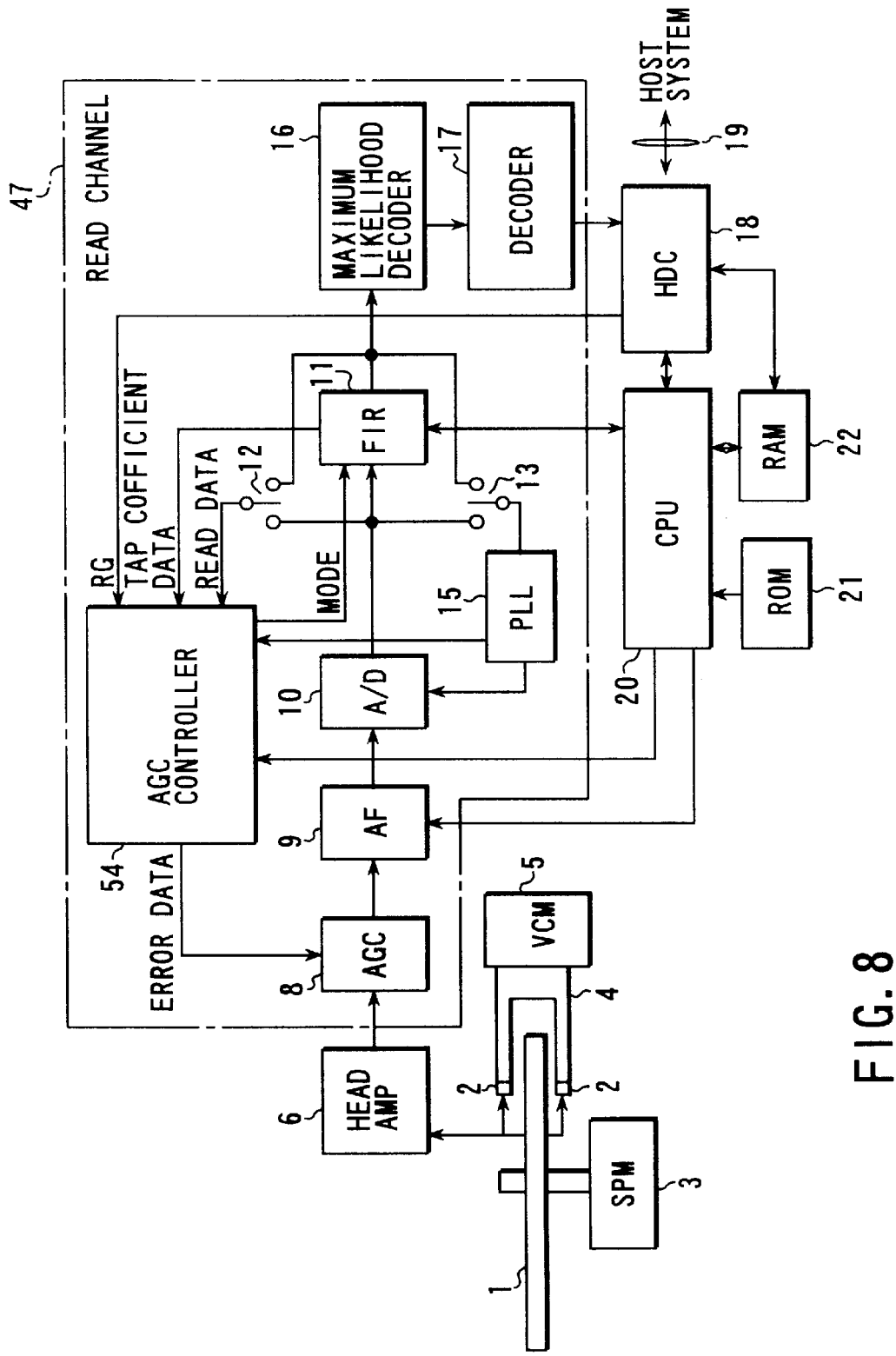
FIG. 8 is a block diagram of a magnetic disk device according to a second embodiment of the present invention, centering on its read channel.

FIG. 8 is a block diagram of a magnetic disk device according to the second embodiment, centering on its read channel. In FIG. 8, the same parts as those in FIG. 5 are indicated by the same reference symbols.

The magnetic disk device of FIG. 8 is characterized by including a new read channel 47 that uses an AGC controller 54 for computing amplitude errors in the analog loop and digital loop from the tap coefficient of the FIR filter 11, determining an offset voltage for the AGC amplifier 8 corresponding to the amplitude errors, and applying feedback to the AGC amplifier 8, instead of the AGC controller 14 of FIG. 5. Although the ROM 21 stores a control program different from that in the ROM 21 of FIG. 5, it is indicated by the same numeral 21 for the sake of convenience.

Figures 9, 10:
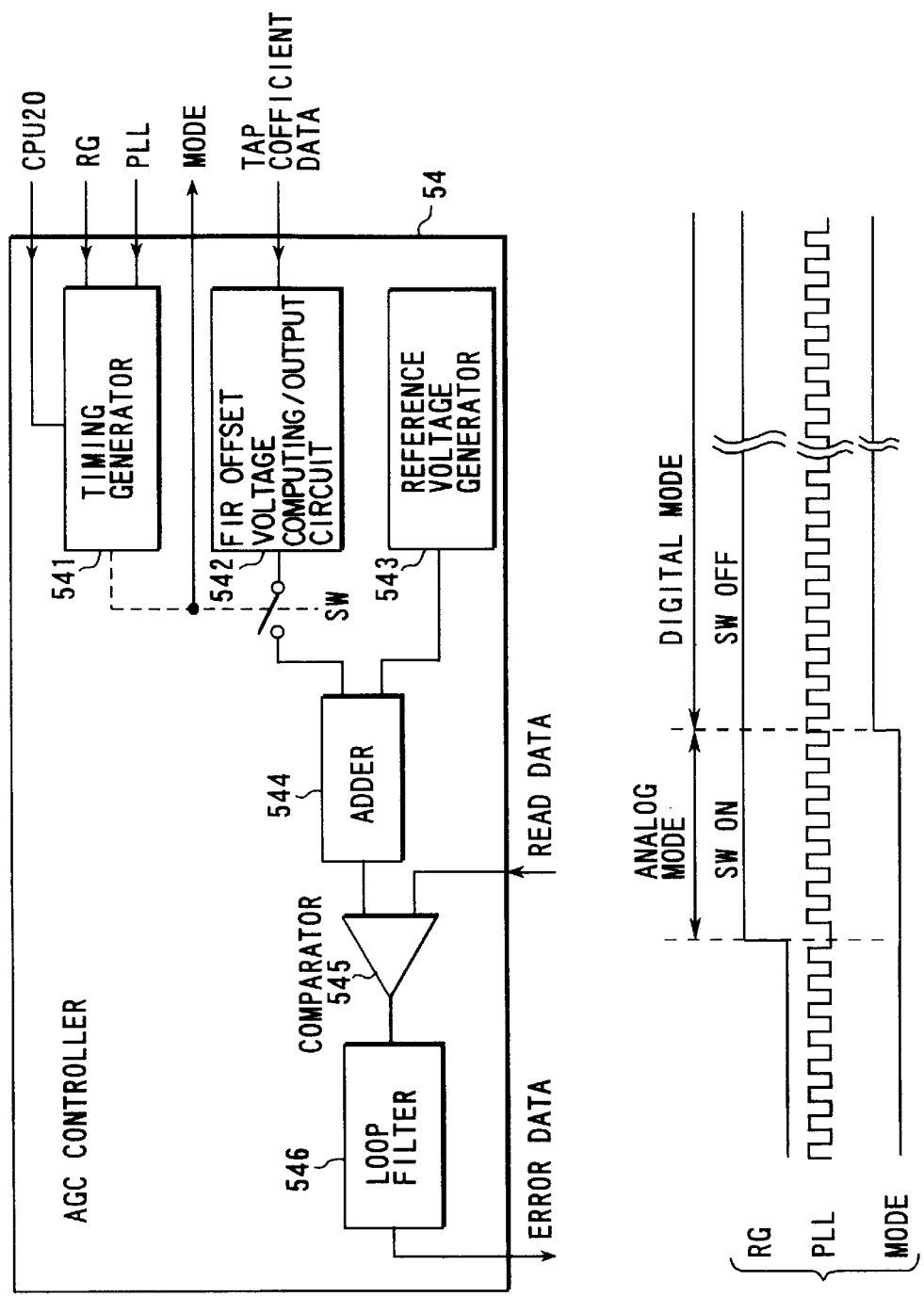
FIG. 9 is a block diagram of the AGC controller shown in FIG. 8.
FIG. 10 is a timing chart to help explain the operation of the timing generator circuit shown in FIG. 9.

The configuration of the AGC controller 54 is shown in FIG. 9.

The AGC controller 54 comprises a timing generator circuit 541, an FIR offset voltage computing/output circuit 542, a reference voltage generator 543, an adder circuit 544, a switch SW, a cooperator 542, and a loop filter 546.

The timing generator circuit 541 is, for example, a timer circuit for generating a timing signal (hereinafter, referred to as a Mode signal) providing the timing for the switching of the analog loop (analog mode) to the digital loop (digital mode) as shown in FIG. 10. With the timing that the read gate RG from the HDC 18 turns on, the timing generator circuit 541 starts to count the clock (PLL clock) from the PLL circuit 15, continues counting until the number of clocks preset in the timing generator circuit 541 has been reached, and outputs a Mode signal shown in FIG. 10. The CPU 20 sets information on the number of clocks counted, that is, information about how many PLL clocks have to arrive since the turning on of the read gate RG before the analog loop is switched to the digital loop.

The FIR offset voltage computing/output circuit 542 calculates amplitude errors (the amount of fluctuation in the amplitude) in the analog loop and digital loop and generates an offset voltage (FIR offset voltage) for the AGC amplifier 8 corresponding to the amplitude errors. When the amplitude in the digital loop is smaller, or when the output of the FIR filter 11 is smaller that its input, the offset voltage is positive. When the amplitude in the digital loop is larger, or when the output of the FIR filter 11 is larger than its input, the offset voltage is negative. As seen from the examples in FIGS. 10 to 12 where the amplitude of the input of the 3-tap FIR filter differs from that of its output, once the tap coefficient of the FIR filter 11 has been determined, the amount of fluctuation in the amplitude (amplitude errors) between the input and output of the FIR filter 11 is found by calculation. This will be explained using a case where the number of taps of the FIR filter 11 is three as in FIG. 10 and the tap coefficient is −0.25 (a case where the FIR filter 11 is equalized in the direction in which a boost is applied).

Figure 12:
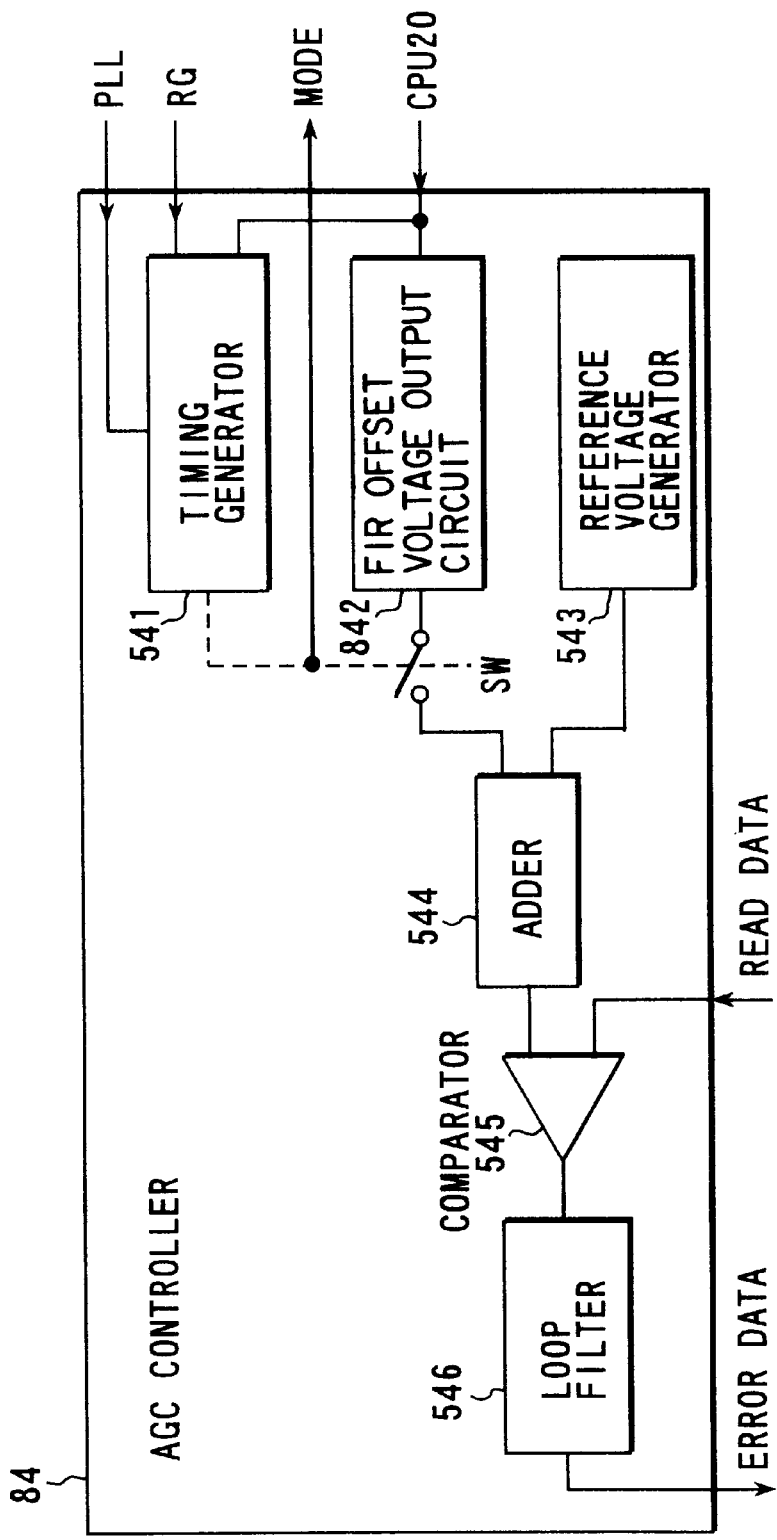
FIG. 12 is a block diagram of the AGC controller shown in FIG. 11.

As shown in FIG. 12, when the amplitudes of the filter input at sampling points of time 5, 6, and 7 are 4, 16, and 16, the amplitudes at points A, B, and C at sampling point of time 7 are 16×−0.25=−4, 16×1=16, 4×−0.25=−1. Therefore, the filter output at sampling point of time 7 is the sum total of these, −4+16−1=11, meaning that the amplitude reduces by five (16→11). That is, once the tap coefficient of the FIR filter 11 has been found, the amount of fluctuation in the amplitude between the input and output of the FIR filter 11 can be computed.

It is possible to eliminate the above calculation by computing a fluctuation in the amplitude for each tap coefficient of the FIR filter 11 beforehand and preparing a table showing the correlation between them.

The FIR offset voltage computing/output circuit 542 generates a positive or negative FIR offset voltage corresponding to the amount of fluctuation in the amplitude (amplitude errors) obtained on the basis of the tap coefficient.

On the other hand, the reference voltage generator 543 generates a reference voltage to be compared with the amplitude of the read data from the A/D converter 10 or FIR filter 11. The reference voltage from the reference voltage generator 543 is supplied to one input of the adder circuit 544.

The switch SW is provided between the other input of the adder circuit 544 and the output of the FIR offset voltage computing/output circuit 542. Only when the Mode signal from the timing generator circuit 541 does not indicate the digital loop (digital mode), the SW is on and supplies the FIR offset voltage from the FIR offset voltage computing/output circuit 542 to the other input of the adder circuit 544.

During a period of time when the switch SW is on, or when the digital loop (digital mode) is out of operation, the adder circuit 544 adds the reference voltage from the reference voltage generator 543 and the FIR offset voltage from the FIR offset voltage computing/output circuit 542 supplied via the switch SW and outputs the resulting voltage to the comparator 545. Accordingly, during a period of the analog loop (analog mode), the voltage obtained by adding the reference voltage and the FIR offset voltage corresponding to the amount of fluctuation in the amplitude between the input and output of the FIR filter 11 in the digital loop (digital mode) is output to the comparator 545 in anticipation of the switching to the digital loop (digital mode).

On the other hand, in a period of time when the switch SW is off, or in a period of the digital loop (digital mode), the adder circuit 544 outputs the reference voltage from the reference voltage generator 543 as it is to the comparator 545. That is, the offset voltage is equivalent to zero in the period of the digital loop (digital mode).

As described above, the comparator 545 compares the amplitude of the read data from the A/D comparator 10 with the voltage obtained by adding the FIR offset voltage to the reference voltage in the period of the analog loop, whereas it compares the amplitude of the read data from the FIR filter 11 with the reference voltage in the period of the digital loop. The comparator 545 is composed of, for example, a differential amplifier and outputs a current corresponding to an amplitude error. The output of the comparator 545 is shaped at the loop filer 546 composed of, for example, an integrating circuit, so that the output may be compatible with the response characteristic of the AGC amplifier 8 and supplies it as error data to the AGC amplifier 8.

As a result, in the analog loop, the gain of the AGC amplifier 8 is increased as much as the amplitude fluctuates at the FIR filter 11, as compared with a case where an FIR offset voltage is not added as in the prior art, or a case where the amplitude of the read data is compared with the reference voltage.

Specifically, when the tap coefficient of the FIR filter 11 is negative (i.e. when the FIR filter 11 is equalized in the direction in which a boost is applied), the FIR offset voltage computing/output circuit 542 generates a positive FIR offset voltage corresponding to a decrease in the amplitude, taking into account the fact that the amplitude at the output of the FIR filter 11 is smaller than that at its input. Because of this, in the analog loop (analog mode), the gain of the AGC amplifier 8 is raised beforehand as much as the amplitude decreases at the FIR filter 11. When the tap coefficient of the FIR filter 11 is positive (i.e. when the FIR filter 11 functions as a low-pass filter), the FIR offset voltage computing/output circuit 542 generates a negative FIR offset voltage corresponding to an increase in the amplitude, taking into account the fact that the amplitude at the output of the FIR filter 11 is larger than that at its input. Because of this, in the analog loop (analog mode), the gain of the AGC amplifier 8 is lowered beforehand as much as the amplitude increases at the FIR filter 11.

As described above, with the second embodiment, the reference voltage for the reference voltage generator 543 is not used as it is for comparison with the amplitude of the read data in the analog loop. The reference voltage added with the FIR offset voltage corresponding to the amount of fluctuation in the amplitude between the input and output of the FIR filter 11 determined by the tap coefficient of the FIR filter 11 is used for the comparison. This enables the gain of the AGC amplifier 8 to increase or decrease beforehand as much as the amplitude decreases or increases at the FIR filter 11.

In this case, even when the analog loop (analog mode) is switched to the digital loop (digital mode), the fluctuations settle down in a short time because the gain of the AGC amplifier 8 is increased or decreased as much as the amplitude decreases or increases at the FIR filter 11.

Hereinafter, a magnetic disk device according a third embodiment of the present invention will be explained.

Figure 11:
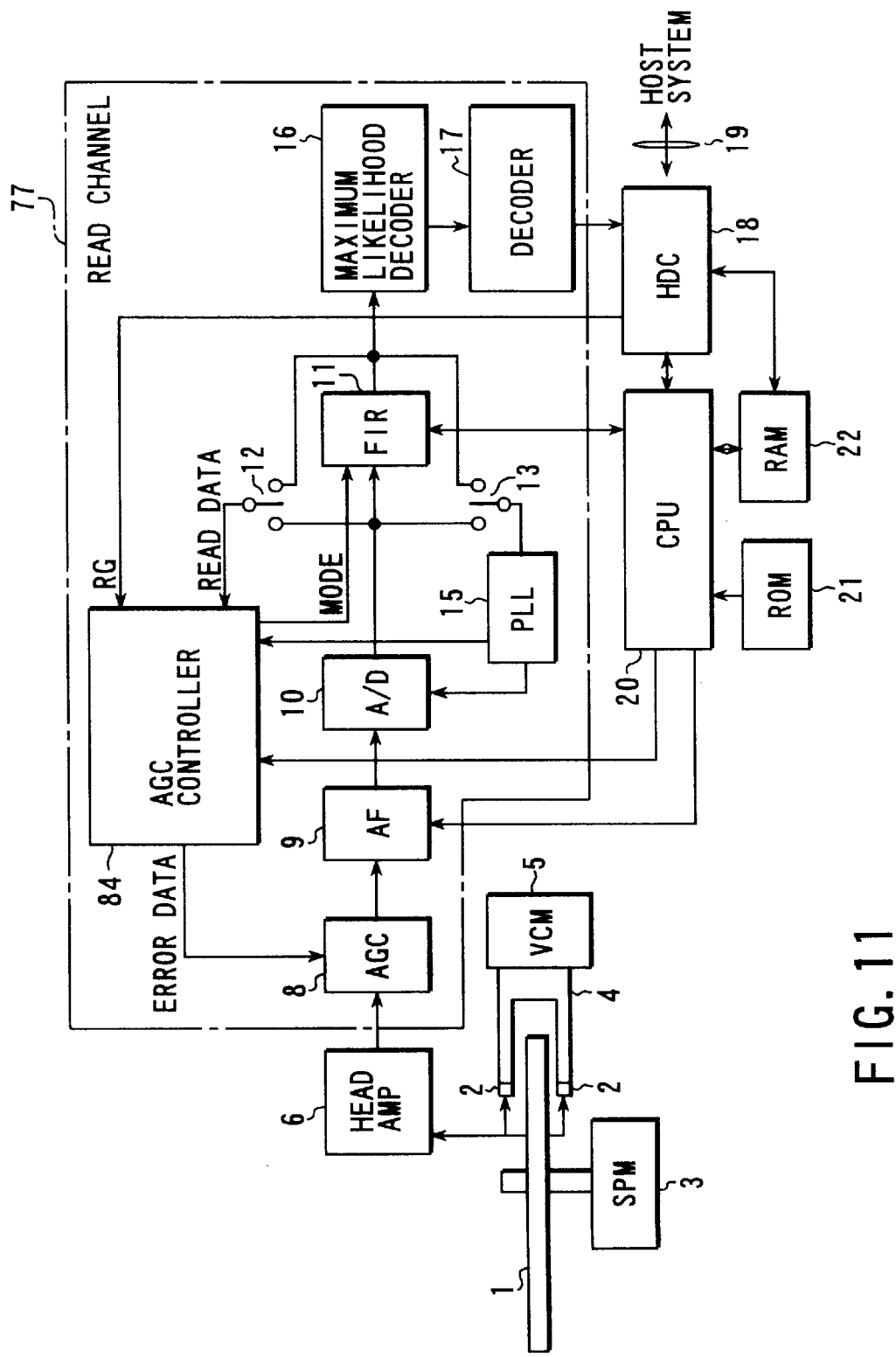
FIG. 11 is a block diagram of a magnetic disk device according to a third embodiment of the present invention, centering on its read channel.

FIG. 11 is a block diagram of a magnetic disk device according to the third embodiment, centering on its read channel. In FIG. 11, the same parts as those in FIG. 8 are indicated by the same reference symbols.

The magnetic disk device of FIG. 11 is characterized in that the CPU 20, according to the control program in the ROM 21, calculates an offset voltage for the AGC amplifier 8 corresponding to amplitude errors in the analog loop and digital loop on the basis of the tap coefficient of the FIR filter 11 and that a new read channel 77 which uses an AGC controller 84 for generating an offset voltage having the voltage value computed at the CPU 20 and feeds it back to the AGC amplifier 8 is used instead of the AGC controller 54 of FIG. 8. Although the ROM 21 stores a control program different from that in the ROM 21 of FIG. 8, it is indicated by the same numeral 21 for the sake of convenience.

FIG. 12 is a block diagram of the AGC controller 84. In FIG. 12, the same parts as those in FIG. 9 are indicated by the same reference symbols.

The AGC controller 84 of FIG. 12 differs from the AGC controller 54 of FIG. 9 in that it has an FIR offset voltage output circuit 842 having only an FIR offset voltage output function, instead of the FIR offset voltage computing/output circuit 542 of FIG. 9. The FIR offset voltage output circuit 842 is realized by a register in which the voltage value computed at the CPU 20 is set and a D/A (digital/analog) converter for outputting the offset voltage having the voltage value set in the register. The voltage value has been computed by the CPU 20. Neither the register nor the converter is shown in the figure.

In the magnetic disk device of FIG. 11, from the tap coefficient of the FIR filter 11, the CPU 20 computes an offset voltage for the AGC amplifier 8 corresponding to the amount of fluctuation in the amplitude (amplitude error) between the input and output of the FIR filter 11. Then, the CPU 20 sets the computed voltage value in (the register of) the FIR offset voltage output circuit 842 provided in the AGC controller in FIG. 12. The FIR offset voltage output circuit 842 D/A-converts the voltage value set by the CPU 20 and outputs the corresponding offset voltage.

The subsequent operation of the AGC controller 84 and the effect of the third embodiment are similar to those in the second embodiment, so explanation of them will not be given.

As described in detail, with the present invention, the tap coefficient of the digital equalizer is caused to lie in the permitted range by adjusting the cut-off frequency and boost value of the analog filter, while checking the tap coefficient of the digital equalizer. This enables the analog loop to be switched to the digital loop smoothly, which shortens the settling time and further improves the formatting efficiency of the recording medium.

Furthermore, in the present invention, the amount of fluctuation in the amplitude of the output of the digital equalizer with respect to its input is calculated. During a period of the analog loop, an offset voltage for the AGC amplifier corresponding to the amount of fluctuation in the amplitude is generated. Then, feedback is applied to the AGC amplifier in such manner that the fluctuation is compensated for. This minimizes fluctuations in the amplitude at the digital equalizer when the analog loop is switched to the digital loop, thereby assuring a stable operation even when the tap coefficient is large.

Therefore, with the present invention, problems arising from the fact that the final target value in the PRML read channel differs greatly between the digital loop and the analog loop are overcome.

While in the first to third embodiments, the application of the invention to a magnetic disk device has been explained, the present invention can be applied to a magnetic recording and reproducing device, such as a magneto-optical disk device, a floppy disk device, or a magnetic tape device, provided that it is a storage device having a read channel using a partial response method (a PRML method).

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

I claim:

1. A partial-response storage device comprising:
   an automatic gain control amplifier for amplifying a read signal read from a recording medium to a signal with a specific amplitude;
   an analog filter in which a cut-off frequency and a boost value can be set and which removes high-frequency noises contained in the amplified read signal on the basis of the cut-off frequency and emphasizes the high region of a pass band of the amplified read signal on the bias of the boost value;
   an analog/digital converter for digitizing an output signal from the analog filter;
   a digital equalizer which has the function of adjusting a tap coefficient and subjects the output data from the analog/digital converter to partial response equalization;
   a phase lock loop circuit for generating a clock synchronizing with either the output of the analog/digital converter or that of the digital equalizer in a phase synchronizing loop;
   control loop switching means for switching between an analog loop used to feed back the output data from the analog/digital converter and a digital loop used to feed back the output data from the digital equalizer with a desired timing and applying the feedback to the automatic gain control amplifier and the phase lock loop circuit;
   filter adjusting means for adjusting the cut-off frequency and boost value of the analog filter;
   judging means for judging whether or not the tap coefficient of the digital equalizer is in a predetermined permitted range each time the filter adjusting means adjusts the cut-off frequency and boost value of the analog filter; and
   filter parameter decision means for determining the cut-off frequency and boost value adjusted by the filter adjusting means to be the optimum cut-off frequency and boost value for the analog filter when the judging means has judged that the tap coefficient of the digital equalizer is in the permitted range.

2. A partial-response storage device according to claim 1, wherein the filter adjusting means is started in a specific filter adjusting mode.

3. A partial-response storage device according to claim 2, further comprising:
   a nonvolatile memory for storing the cut-off frequency and boost value determined by the filter parameter decision means; and
   filter parameter setting means for setting the cut-off frequency and boost value stored in the nonvolatile memory in the analog filter in a normal mode.

4. A partial-response storage device according to claim 1, further comprising one or more heads for reading the data recorded on the recording medium and generating the read signal, one for each recording side of the recording medium, wherein
   the filter adjusting means adjusts the cut-off frequency and boost value of the analog filter for each of the one or more heads.

5. A partial-response storage device according to claim 4, wherein the recording medium is formatted by a constant density recording method and the filter adjusting means adjusts the cut-off frequency and boost value of the analog filter for each zone of the recording medium.

6. A partial-response storage device comprising:
   an automatic gain control amplifier for amplifying a read signal read from a recording medium to a signal with a specific amplitude;
   an analog filter in which a cut-off frequency and a boost value can be set and which removes high-frequency noises contained in the amplified read signal on the basis of the cut-off frequency and emphasizes the high region of a pass band of the amplified read signal on the bias of the boost value; an analog/digital converter for digitizing an output signal from the analog filter; a digital equalizer which has the function of adjusting a tap coefficient and subjects the output data from the analog/digital converter to partial response equalization;
   a phase lock loop circuit for generating a clock synchronizing with either the output of the analog/digital converter or that of the digital equalizer in a phase synchronizing loop;
   control loop switching means for switching between an analog loop used to feed back the output data from the analog/digital converter and a digital loop used to feed back the output data from the digital equalizer with a desired timing and applying the feedback to the automatic gain control amplifier and the phase lock loop circuit; and
   a control circuit which applies feedback to the automatic gain control amplifier on the basis of either the output of the analog/digital converter or that of the digital equalizer and which includes an offset voltage value decision circuit that computes the amount of fluctuation in the amplitude of the output from the digital equalizer with respect to its input on the basis of the tap coefficient of the equalizer and determines an offset voltage value for the automatic gain control amplifier corresponding to the amount of fluctuation in the amplitude, and a feedback circuit which applies feedback to the automatic gain control amplifier during a period of the analog loop on the basis of the output data from the analog/digital converter and the offset voltage having the voltage value determined by the offset voltage value decision circuit.

7. A partial-response storage device according to claim 6, wherein the feedback circuit includes:

an adder circuit which adds the offset voltage having the voltage value determined by the offset voltage decision circuit to a predetermined reference voltage during a period of the analog loop and outputs the resulting voltage and which outputs the reference voltage as it is during a period of the digital loop; and a comparator circuit which compares either the amplitude of the output data of the analog/digital converter or that of the digital equalizer with the output of the adder circuit and which controls the gain of the automatic gain control amplifier on the basis of the comparison result.

8. A partial-response storage device according to claim 6, further comprising a table showing the relationship between the tap coefficient and the amount of fluctuation in the amplitude, wherein the offset voltage value decision circuit determines the amount of fluctuation in the amplitude according to the table.

9. A partial-response storage device comprising:

an automatic gain control amplifier for amplifying a read signal read from a recording medium to a signal with a specific amplitude;

an analog filter in which a cut-off frequency and a boost value can be set and which removes high-frequency noises contained in the amplified read signal on the basis of the cut-off frequency and emphasizes the high region of a pass band of the amplified read signal on the bias of the boost value;

an analog/digital converter for digitizing an output signal from the analog filter;

a digital equalizer which has the function of adjusting a tap coefficient and subjects the output data from the analog/digital converter to partial response equalization;

a phase lock loop circuit for generating a clock synchronizing with either the output of the analog/digital converter or that of the digital equalizer in a phase synchronizing loop;

control loop switching means for switching between an analog loop used to feed back the output data from the analog/digital converter and a digital loop used to feed back the output data from the digital equalizer with a desired timing and applying the feedback to the automatic gain control amplifier and the phase lock loop circuit;

a CPU which controls all of the storage device and which computes the amount of fluctuation in the amplitude of the output of the digital equalizer with respect to its input on the basis of the tap coefficient of the digital equalizer and determines an offset voltage value for the automatic gain control amplifier corresponding to the amount of fluctuation in the amplitude; and a control circuit which applies feedback to the automatic gain control on the basis of either the output data of the analog/digital converter or that of the digital equalizer and which includes an offset voltage output circuit that outputs an offset voltage having the offset voltage value determined by the CPU, and a feedback circuit that applies feedback to the automatic gain control amplifier during a period of the analog loop on the basis of the output data from the analog/digital converter and the offset voltage output from the offset voltage output circuit.

10. A partial-response storage device according to claim 9, wherein the feedback circuit includes:

an adder circuit which adds an offset voltage output from the offset voltage output circuit to a predetermined reference voltage during a period of the analog loop and outputs the resulting voltage and which outputs the reference voltage as it is during a period of the digital loop; and a comparator circuit which compares either the amplitude of the output data of the analog/digital converter or that of the digital equalizer with the output of the adder circuit and which controls the gain of the automatic gain control amplifier on the basis of the comparison result.

11. A partial-response storage device according to claim 9, further comprising a table showing the relationship between the tap coefficient and the amount of fluctuation in the amplitude, wherein the CPU determines the amount of fluctuation in the amplitude according to the table.

12. A filter adjusting method applied to a partial-response storage device including an automatic gain control amplifier for amplifying a read signal read from a recording medium to a signal with a specific amplitude, an analog filter in which a cut-off frequency and a boost value can be set and which removes high-frequency noises contained in the amplified read signal on the basis of the cut-off frequency and emphasizes the high region of a pass band of the amplified read signal on the bias of the boost value, an analog/digital converter for digitizing an output signal from the analog filter, a digital equalizer which has the function of adjusting a tap coefficient and subjects the output data from the analog/digital converter to partial response equalization, a phase lock loop circuit for generating a clock synchronizing with either the output of the analog/digital converter or that of the digital equalizer in a phase synchronizing loop, and control loop switching means for switching between an analog loop used to feed back the output data from the analog/digital converter and a digital loop used to feed back the output data from the digital equalizer with a desired timing and applying the feedback to the automatic gain control amplifier and the phase lock loop circuit, the filter adjusting method comprising the steps of:

adjusting the cut-off frequency and boost value of the analog filter on the basis of the tap coefficient of the digital equalizer; and determining a cut-off frequency and boost value for the analog filter so that the tap coefficient of the digital equalizer may lie in a predetermined permitted range.

13. A filter adjusting method according to claim 12, wherein the determining step includes the steps of:

judging whether or not the tap coefficient of the digital equalizer is in the predetermined permitted range each time the adjusting step adjusts the cut-off frequency and boost value of the analog filter; and determining the cut-off frequency and boost value adjusted by the filter adjusting means to be the optimum cut-off frequency and boost value for the analog filter when the judging step has judged that the tap coefficient of the digital equalizer is in the permitted range.

14. A filter adjusting method according to claim 12, wherein the adjusting step is started in a specific filter adjusting mode.

15. A filter adjusting method according to claim 12, wherein the storage device includes a nonvolatile memory for storing the cut-off frequency and boost value determined in the parameter determining step, and the filter adjusting method further comprises the step of setting the cut-off frequency and boost value stored in the nonvolatile memory in the analog filter in a normal mode.

16. A filter adjusting method according to claim 12, wherein the storage device includes one or more heads for reading the data recorded on the recording medium and generating the read signal, one for each recording side of the recording medium, and the adjusting step includes the step of adjusting the cut-off frequency and boost value of the analog filter for each of the one or more heads.

17. A filter adjusting method according to claim 16, wherein the recording medium is formatted by a constant density recording method, and the adjusting step adjusts the cut-off frequency and boost value of the analog filter for each zone of the recording medium.

18. A method of controlling an automatic gain control amplifier applied to a partial-response storage device including an automatic gain control amplifier for amplifying a read signal read from a recording medium to a signal with a specific amplitude, an analog filter in which a cut-off frequency and a boost value can be set and which removes high-frequency noises contained in the amplified read signal on the basis of the cut-off frequency and emphasizes the high region of a pass band of the amplified read signal on the bias of the boost value, an analog/digital converter for digitizing an output signal from the analog filter, a digital equalizer which has the function of adjusting a tap coefficient and subjects the output data from the analog/digital converter to partial response equalization, a phase lock loop circuit for generating a clock synchronizing with either the output of the analog/digital converter or that of the digital equalizer in a phase synchronizing loop, and control loop switching means for switching between an analog loop used to feed back the output data from the analog/digital converter and a digital loop used to feed back the output data from the digital equalizer with a desired timing and applying the feedback to the automatic gain control amplifier and the phase lock loop circuit, the method comprising the steps of:

computing the amount of fluctuation in the amplitude of the output from the digital equalizer with respect to its input on the basis of the tap coefficient of the equalizer and determining an offset voltage value for the automatic gain control amplifier corresponding to the amount of fluctuation in the amplitude, and applying feedback to the automatic gain control amplifier during a period of the analog loop on the basis of the output data from the analog/digital converter and the offset voltage having the determined voltage value.

19. A method of controlling an automatic gain control amplifier according to claim 18, wherein the feedback applying step includes:

a first substep of adding the offset voltage having the voltage value determined in the determining step to a predetermined reference voltage during a period of the analog loop and outputting the resulting voltage and of outputting the reference voltage as it is during a period of the digital loop; and a second substep of comparing either the amplitude of the output data of the analog/digital converter or that of the digital equalizer with the output of the first substep and controlling the gain of the automatic gain control amplifier on the basis of the comparison result.

* * * * *